United States Patent [19]

Lusk et al.

[11] 4,223,179
[45] Sep. 16, 1980

[54] CABLE TERMINATION CONNECTOR ASSEMBLY

[75] Inventors: George E. Lusk; Stephen D. Northrup, both of Woodstock, Ill.

[73] Assignee: Joslyn Mfg. and Supply Co., Chicago, Ill.

[21] Appl. No.: 867,094

[22] Filed: Jan. 5, 1978

[51] Int. Cl.² .................. H02G 15/02; H01R 7/12
[52] U.S. Cl. .................. 174/73 R; 24/135 N; 29/857; 174/75 D; 339/250; 339/272 R
[58] Field of Search .......... 174/75 D, 73 R, 73 SC; 339/272 R, 272 A, 242, 250; 24/122.3, 122.6, 135 N; 403/362; 29/628

[56] References Cited

U.S. PATENT DOCUMENTS

| 1,953,290 | 4/1934 | Daniel | 403/409 X |
| 2,778,001 | 1/1957 | Girton | 339/272 A X |
| 3,600,765 | 8/1971 | Rovinsky et al. | 24/122.6 |
| 3,609,657 | 9/1971 | Stanback | 403/362 X |
| 3,796,821 | 3/1974 | Lusk | 174/73 R |
| 3,864,013 | 2/1975 | Levy | 339/272 A |
| 4,046,958 | 9/1977 | Lusk | 174/73 R |

Primary Examiner—B. A. Reynolds
Assistant Examiner—E. F. Borchelt
Attorney, Agent, or Firm—Mason, Kolehmainen, Rathburn & Wyss

[57] ABSTRACT

A cable termination connector assembly for physically receiving and securely retaining the bared end of a current carrying center conductor of a high voltage power cable and for making an external electrical connection to the center conductor includes a multi-barrel connector for use with many different sizes of high voltage power cables. A plurality of elongated, generally axially extending apertures are formed in the connector for receiving the wire strands of a segmented or nonsegmented center conductor of a high voltage power cable. In a specific embodiment, the apertures are canted or inclined with respect to the longitudinal axis of the center conductor and the multi-barrel connector to minimize the length of cable insulation that is cut away or stripped back and thereby increase the dielectric strength or reduce the size of the termination assembly and facilitate insertion of the wire strands. A plurality of oval point set screws associated with each of the apertures of the connector securely retains the wire strands within the connector and breaks-up aluminum oxide coatings existing on the wire strands of aluminum cable conductors.

In a specific embodiment, each plurality of set screws are arranged so that each is at a different radial position with respect to the longitudinal axis of the associated aperture to provide improved current distribution within the multi-barrel connector and to achieve contact with a greater number of individual wire strands in each aperture.

32 Claims, 14 Drawing Figures

CABLE TERMINATION CONNECTOR ASSEMBLY

BACKGROUND OF THE INVENTION

A. Field of the Invention

The device of the present invention relates generally to a new and improved high voltage cable termination and, more particularly, to a new and improved high voltage cable termination connector assembly for use with many sizes of high voltage power cables.

B. Description of the Prior Art

Many high voltage power cables have been and are being manufactured with either segmented or nonsegmented center conductors formed from aluminum wire strands rather than copper wire strands due to the availability of aluminum wire and its usually lower cost. The use of aluminum wire strands does, however, have its disadvantages. One major disadvantage is the rather rapid formation of aluminum oxide coatings on the outer surfaces of the aluminum wire strands and of associated aluminum connecting devices. Such coatings retard the flow of electrical current across the junction formed by the aluminum wire strands and a connecting device. In addition, aluminum wire strands experience relatively rapid metal fatigue when subjected to extreme hot and cold expansion and contraction cycles caused by changes in the ambient temperature and the operation temperature of the electrical system.

Many different types of connectors are used in the prior art to electrically connect the center conductor of a terminated high voltage power cable to an external electrical connector. U.S. Pat. No. 3,796,821 illustrates one type of a prior art high voltage cable termination connector that has been used for smaller power cable sizes. A single device illustrated in U.S. Pat. No. 3,796,821 is not adaptable for use with power cables of widely varying sizes and wire gauges. Thus, different cable termination connectors of the type illustrated in U.S. Pat. No. 3,796,821 must be available for use with substantially different sized power cables.

U.S. Pat. No. 4,046,958 illustrates another type of cable termination. In this type of cable termination connector assembly, a multi-barrel connector is utilized for use with different sizes of high voltage power cables. A plurality of apertures are formed in the connector for receiving the wire strands of a segmented or nonsegmented center conductor of a high voltage power cable. A pair of set screws associated with each of the apertures force the wire strands of the center conductor against the inner walls of the apertures to retain the wire strands.

When a power cable is terminated, the conductor is exposed by removing some lengths of both the insulation and the outer conductive cable sheath or shield. The outer conductive cable sheath is removed to terminate the sheath within the termination assembly at the lower end. The cable insulation layer is removed or stripped back to the extent necessary to insert the center conductor into the connector assembly. The length of the strip-back is inversely related to an internal, longitudinal dielectric strength of the terminator assembly and thus it is desirable to minimize the amount of strip-back. This increased longitudinal dielectric strength is particularly desirable for DC voltage applications. Also where internal capacitor control of the terminator electrical field is utilized to reduce the physical size of the termination reduction of cable insulation strip-back allows the capacitor units to be stacked closer to the connector end of the terminator, thus allowing further reduction in the size and cost of the terminator. While the cable termination connector assemblies of the prior art are generally suitable for their intended purpose, it would be desirable to provide a connector assembly that reduces the amount of cable insulation strip-back thereby increasing the dielectric strength of the terminator assembly or reducing the physical size of the terminator.

Due to the increased usage of segmented or nonsegmented center conductors formed from aluminum wire strands, it is extremely important that the conductor assemblies of the cable termination assembly provide more uniform radial distribution of current density about the longitudinal axis of the connector and achieve electrical and mechanical contact with a maximum percentage of the conductor strands.

SUMMARY OF THE INVENTION

An object of the present invention is to provide a new and improved cable termination connector assembly.

Another object of the present invention is to provide a new and improved high voltage cable termination connector assembly suitable for use with many different sizes of high voltage power cables.

Another object of the present invention is to provide a new and improved multi-barrel connector for receiving and retaining the center conductors of various sizes of high voltage power cables.

A further object of the present invention is a multi-barrel connectors that provides improved current distribution and achieves contact with a maximum number of individual wire strands.

Another object of the present invention is to provide a multi-barrel connector for a cable termination assembly that allows maximum dielectric strength or reduced physical size of the termination assembly and facilitates insertion of the center conductor.

Briefly, the present invention is directed to a new and improved cable termination connector assembly for use in receiving and securely retaining many different sizes of segmented or nonsegmented current carrying center conductors high voltage power cable and for making external electrical connections to the center conductors. The cable termination connector assembly includes a multi-barrel connector that has a plurality of elongated, generally axially extending apertures for receiving the wire strands of the various sized center conductors of high voltage power cables. In a specific embodiment, the apertures are canted or inclined with respect to the longitudinal axis of the center conductor and multi-barrel connector to minimize the amount of insulation that is cut away or stripped back and thereby maximize the dielectric strength or reduce the size of the termination assembly and to facilitate insertion of the wire strands. A plurality of preferably oval point set screws associated with each of the apertures of the connector secures the wire strands in each aperture and breaks-up the aluminum oxide coating that may be present on the wire strands of an aluminum center conductor. In a specific embodiment each plurality of set screws are arranged so that each is at a different radial position with respect to the longitudinal axis of the associated aperture to provide improved current distribution within the multi-barrel connector and to achieve contact with the maximum possible number of wire strands in each aperture.

The connector is supported by a metallic cap plate that provides an effective heat sink to maintain a more uniform temperature throughout the duty cycle of the cable termination. The multi-barrel connector in one arrangement seals the interior of the cable termination and includes a threaded connector stud for making an external electrical connection. In a second arrangement the apertures are formed through the multi-barrel connector and a connector housing is provided that rests on the cap plate, seals the connector and the interior of the cable termination and supports a threaded connector stud for making the external connection. Finally, the cable termination connector assembly includes a corona shield secured to the metallic cap plate and provided with an aperture through which the threaded connector stud extends for making an external electrical connection.

BRIEF DESCRIPTION OF THE DRAWINGS

The above and other objects and advantages and novel features of the present invention will become apparent from the following detailed description of the preferred embodiment of the invention illustrated in the accompanying drawings, wherein.

DESCRIPTION OF THE PREFERRED EMBODIMENT

A high pressure oil filled cable termination 10 (FIGS. 1, 2 and 3) includes a cable termination connector assembly 12, a base assembly 14 and a porcelain insulator 16 disposed therebetween. The cable termination 10 is used to terminate a high voltage power cable 18, for example, a 138KV power cable 18. The power cable 18 conventionally includes a segmented center conductor 20, having four center conductor segments 22, 24, 26 and 28 (FIG. 5), each formed by a plurality of individual wire strands. In a specific embodiment, the wire strands are aluminum wire strands. The power cable 18 further includes cable insulation 30 surrounding the center conductor 20 and an outer conductive cable sheath (now shown).

A plurality of conventional, conductive, metallic skid wires (not shown) are wound in a helical fashion about the cable sheath within a high pressure, oil filled riser pipe stub or pipe 36 of the high pressure, oil filled pipe system that connects with the cable termination 10 through the pipe 36. The pipe 36 may be secured, for example, by welding, to a metallic mounting plate 38 that is used to physically support the insulator 16 thereabove. An oil fill fitting 40 may be provided to fill the cable termination 10 with dielectric oil or to drain dielectric oil from the cable termination 10 through the mounting plate 38.

Figure 2:
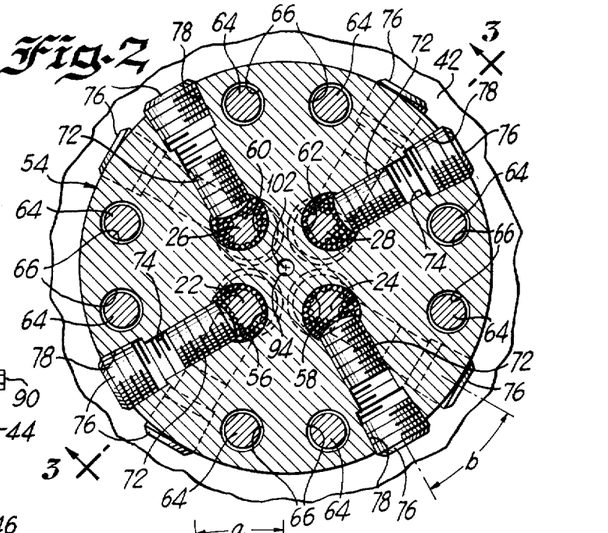
FIG. 2 is an enlarged, cross-sectional view of a portion of the cable termination of FIG. 1 taken along line 2—2 of FIG. 1.

The outer conductive cable sheath is terminated by a stress relief cone 34 as shown in FIG. 2 of copending application Ser. No.647,147 referred to hereinabove. The stress relief cone 34 is utilized to improve the longitudinal dielectric strength of the cable termination 10 as described in more detail in U.S. Pat. No. 3,796,821 referred to hereinbefore.

The cable termination connector assembly 12 (FIGS. 1 through 5) is provided at the upper end of the insulator 16 for physically receiving and securely retaining the center conductor 20 and for making an external electrical connection to the center conductor 20 with an external electrical connector (not illustrated). The connector assembly 12 includes a metallic cap plate 42 formed, in the preferred embodiment, from aluminum and secured by a plurality of threaded fasteners 44 to a metallic cementing flange 46 cemented to the upper end of the insulator 16. The cap plate 42 includes an elongated, axially extending central aperture 48 through which the end of the center conductor 20 extends. The cap plate 42 further includes an annular recess 50 for receiving and retaining a sealing gasket 52. A multi-barrel connector 54, formed in the preferred embodiment from tin plated aluminum, is provided to physically receive and retain the segments 22, 24, 26 and 28 of the center conductor 20. The connector 54 includes a plurality of four, elongated, generally axially extending barrels or apertures 56, 58, 60 and 62 into which the segments 22, 24, 26 and 28 of the center conductor 20 are respectively extended.

In accordance with an important feature of the present invention the apertures 56, 58, 60 and 62 are canted or inclined outwardly with respect to the longitudinal axis 100 of the center conductor 20 and the multi-barrel connectors 54 so that the axis of each of the apertures 56, 58, 60 and 62 forms an acute angle "a", with respect to the longitudinal axis 100 of the center conductor 20, the connector 54 and the cable termination assembly 10. The inclination of the apertures 56, 58, 60 and 62 facilitates the ease of insertion of the segments 22, 24, 26 and 28, minimizes scraping against the sidewall of the apertures 56, 58, 60 and 62 by the segments and minimizes the degree of deformation of the segments 22, 24, 26 and 28 from the longitudinal axis of 100 of the center conductor 20 that is necessary to insert the segments into the multi-barrel connector 54. The flaring out or deformation of the segments 22, 24, 26 and 28 occurs since the apertures 56, 58, 60 and 62 by necessity are somewhat offset from the longitudinal axis 100 of the center conductor 20 and the physical center point 102 of the multi-barrel connector 54.

In accordance with a further important aspect of the present invention, minimizing the deformation of the segments 22, 24, 26 and 28 from the longitudinal axis of the center conductor 20 allows for the minimum amount of the insulation layer 30 to be cut away, stripped back or otherwise removed in order to accomplish the termination and thus results in the maximum internal, longitudinal dielectric strength of the cable termination assembly for a given length of the porcelain insulator 16. The maximum possible dielectric strength with the shortest length of porcelain insulator is extremely important to reduce flashover and particularly for DC voltage applications. Also where internal capacitor control of the termination electric field is used to reduce the physical size of the termination assembly, a reduction of cable insulation strip-back allows the capacitor units to be stacked closer to the connector end of the terminator thus allowing further reductions in the size and cost of the termination assembly.

In accordance with an important aspect of the present invention and in a specific embodiment, the axis of the apertures 56, 58, 60 and 62 are inclined at an angle "a" of approximately 5° from the longitudinal axis 100 of the center conductor 20. It should be understood, however, that the inclination of the apertures may assume other values dependent upon the parameters of the power cable 18.

The multi-barrel connector 54 is secured in position on the cap plate 42 for effective thermal conductive contact therewith by a plurality of threaded fasteners 64 that extend through a plurality of apertures 66 in the connector 54 and are received and engaged by a plurality of threaded apertures 68 formed in the cap plate 42.

The wire strands forming the segments 22, 24, 26 and 28 are securely retained within each of the apertures 56, 58, 60 and 62, respectively, in a specific embodiment by a pair of preferably oval point set screws 70, 72 received within and engaged by a pair of axially spaced, threaded apertures 74. It should be understood that various numbers of set screws may be utilized for each aperture in other specific embodiments. The set screws 70, 72 provide high pressure against the wire strands that form the segments 22, 24, 26 and 28 to force the wire strands against the axially extending inner walls of each of the apertures 56, 58, 60 and 62 to thereby securely retain the wire strands therein. In addition, the high pressure of the set screws 70, 72 forcing the individual wire strands against the respective inner walls of the apertures 56, 58, 60 and 62 breaks-up the aluminum oxide coatings that may be present on the wire strands when the center conductor 20 is formed by aluminum wire strands. In a specific embodiment, the pairs of set screws 70, 72 are tin plated to improve electrical conduction and current distribution.

In accordance with an important aspect of the present invention, (FIGS. 2, 4, and 5) each pair of set screws 70, 72 are radially non-aligned or offset one from the other with respect to the longitudinal axis of the associated apertures 56, 58, 60 or 62 such that each set screw 72 is at a different radial position with respect to the associated paired set screw 70. The offset arrangement of each of the pairs of set screws 70, 72 is effective to contact a greater percentage of the wire strands than would be accomplished with aligned set screws. Thus, in accordance with an important aspect of the present invention, by contacting more wire strands a more uniform and improved radial distribution of current density about the longitudinal axis 100 of the multi-barrel connector 54 is achieved. This increased wire strand contact is especially important and highly desirable when the center conductor 20 is formed by aluminum wire strands wherein any aluminum oxide coatings present on wire strands tends to reduce the strand-to-strand conductivity which consequently reduces the current distribution within the segments 22, 24, 26 and 28.

Figure 3:
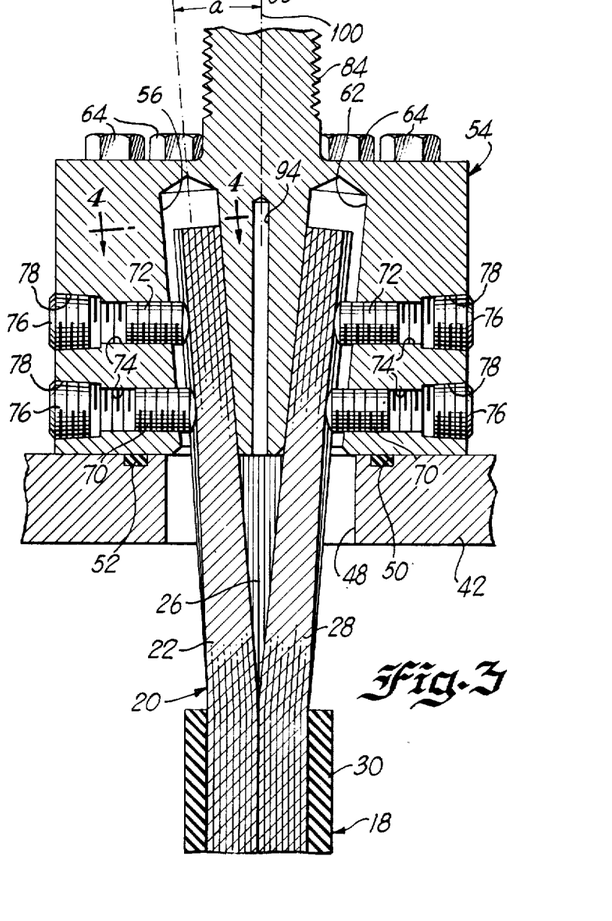
FIG. 3 is an enlarged, fragmentary, cross-sectional view of a portion of the cable termination of FIG. 1 taken along line 3—3 of FIG. 2.
Figures 4, 5, 6:
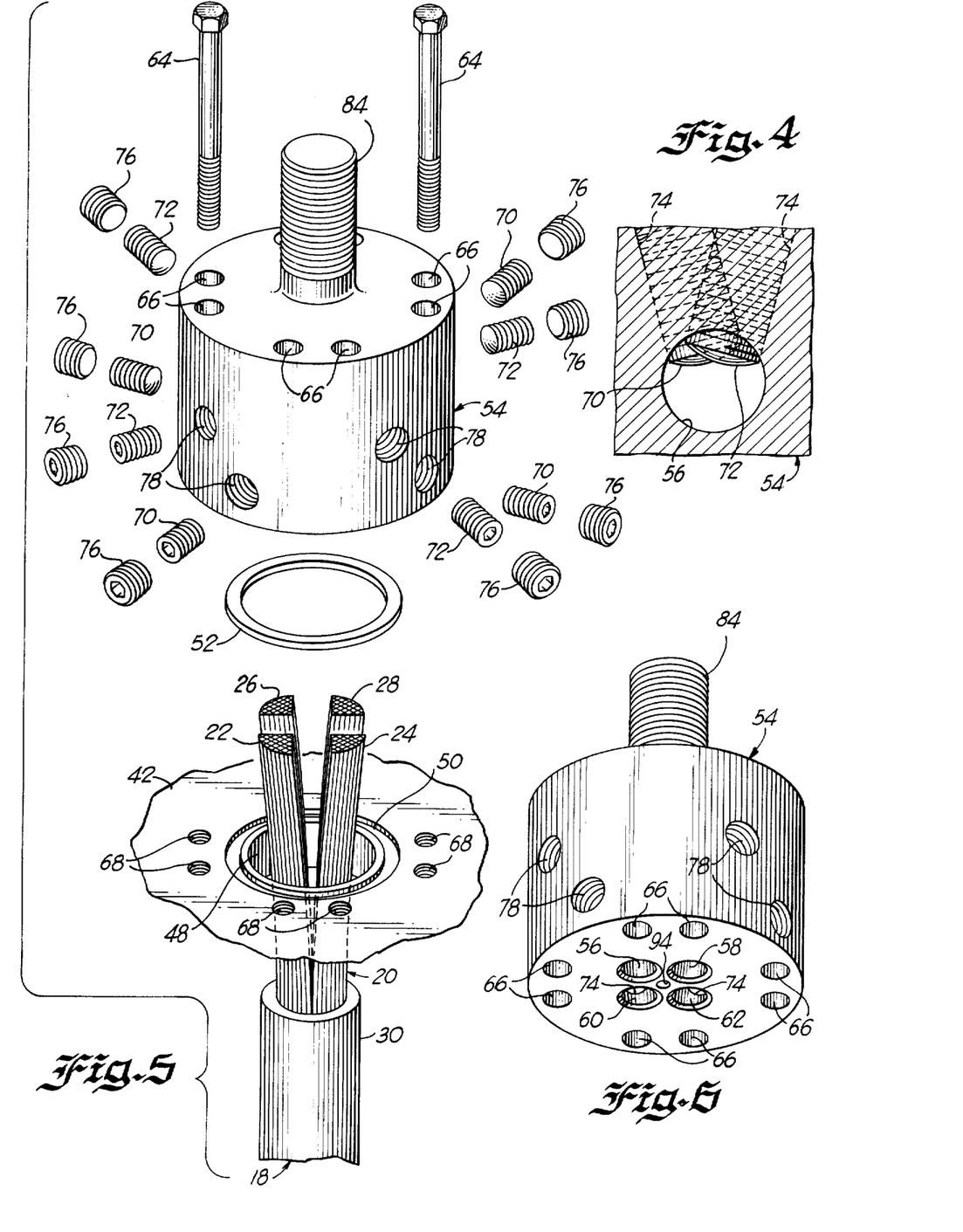
FIG. 4 is an enlarged, fragmentary, cross-sectional view of a portion of the cable termination of FIG. 1 taken along line 4—4 of FIG. 3 with the wire strands of the cable removed for clarity.
FIG. 5 is an enlarged, exploded, perspective view of a portion of the cable termination of FIG. 1 illustrating the manner in which a connector assembly is assembled in a cable termination in accordance with the principles of the present invention.
FIG. 6 is an enlarged, perspective view of a multi-barrel connector forming a portion of the cable termination connector assembly of the cable termination of FIG. 1.

Considering a further important aspect of the present invention, the direction and magnitude of the offset between the set screws 70, 72 is determined in part by the "lay" of the wire segments 22, 24, 26 and 28, i.e., the pattern in which the individual wire strands are twisted as they enter the multi-barrel connector 54. For example, if the lay of the wire is to the right, the set screw 72 is offset to the left of the paired set screw 70 indicated by the angle "b"(FIG. 2). In a specific embodiment, the radial offset between the set screws 70 and 72 with respect to the longitudinal axis of each aperture is approximately 30° C. Thus, the segments 22, 24, 26 and 28 have more strands contacted by the set screws and are forced against the inner walls of the respective apertures 56, 58, 60 and 62 over a wider radial distance as best illustrated in FIGS. 3 and 4.

In accordance with yet another important aspect of the present invention, the pairs of set screws 70, 72 are sealed by pipe plugs 76 which in a preferred specific embodiment are of a larger diameter than the set screws 70, 72 and are fabricated such that no thread sealant is required. In a specific embodiment, socket pressure-pipe plugs referred to as a dryseal type were found suitable and are available from the HOLO-KHROME Corporation, West Hartford, Connecticut. To accommodate the pipe plugs 76, the set screw apertures 74 are overbored to a suitable diameter to form the threaded aperture 78 to accept the pipe plugs 76. In a specific embodiment, the set screws 70, 72 are three quarters of an inch in diameter.

In a specific embodiment, the connector 54 is formed from a massive block of aluminum to thereby serve as an effective heat sink and a thermal connector to the cap plate 42. For example, the connector 54 may be formed from a block of aluminum having a substantially circular cross-section measuring seven inches in diameter and having a thickness or axial length of ten inches.

It should also be understood, however, that the connector 54 may also have a substantially square cross-section. Each of the apertures 56, 58, 60 and 62 may be formed with a diameter of one inch and extend into the connector 54 to a depth of four and one half inches. The connector 54 includes a vent valve 82 and an axial central aperture 94 extending therethrough to enable the interior of the cable termination initially to be filled with a fluid such as a dielectric oil. The connector 54 further includes a threaded connector stud 84 fixedly secured thereto. The connector 54 hermetically seals the interior of the cable termination 10 from the atmosphere and electrically connects the center conductor 20 through a low resistance or short circuit current path to an external electrical connector (not illustrated).

A conductive corona shield 86 having a centrally disposed aperture 88 through which the connector stud 84 extends is installed over the connector 54 and secured in position by a plurality of threaded fasteners 90. The relatively massive cap plate 42 and the connector 54 provide an effective heat sink to dissipate both ambient heat and the heat generated during the operation of the cable termination 10, thereby reducing the severity of the hot and cold, expansion and contraction, cycles on the wire strands forming the center conductor 20.

For power cables smaller than the power cable 18, possibly only one, two or three of the four barrels or apertures 56, 58, 60 and 62 of the connector 54 may be utilized to receive and securely retain the center conductors of the smaller power cables. In this manner, an efficient, relatively simple and inexpensive cable termination connector assembly 12 is provided that reduces and in some cases eliminates many of the major disadvantages of prior art cable termination connector assemblies.

Figure 1:
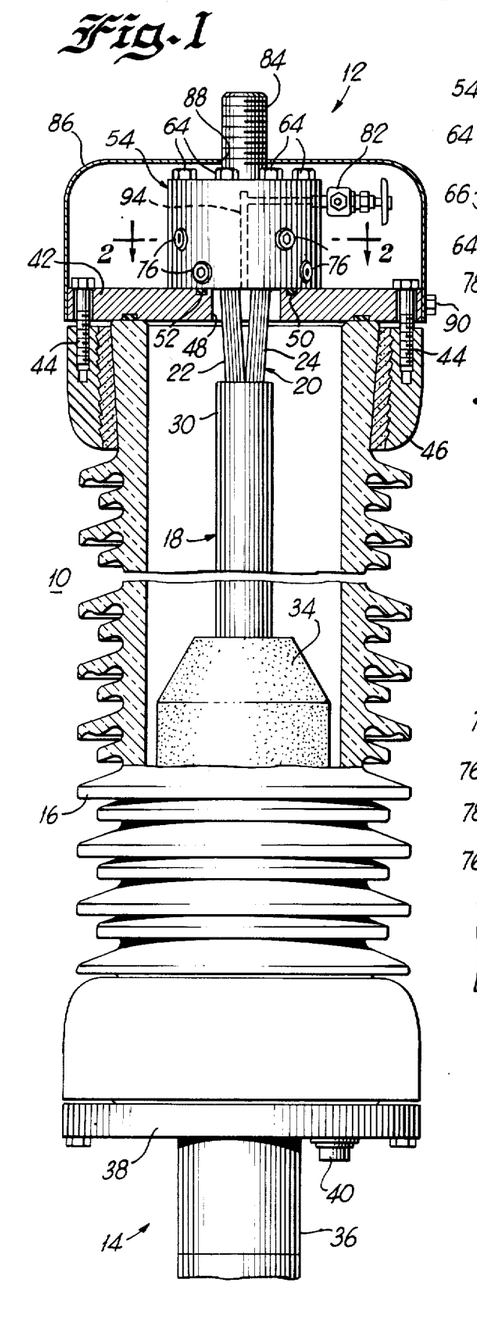
FIG. 1 is an elevational view partly in section of a high voltage cable termination that includes a cable termination connector assembly constructed in accordance with the principles of the present invention.
Figures 7, 8, 9:
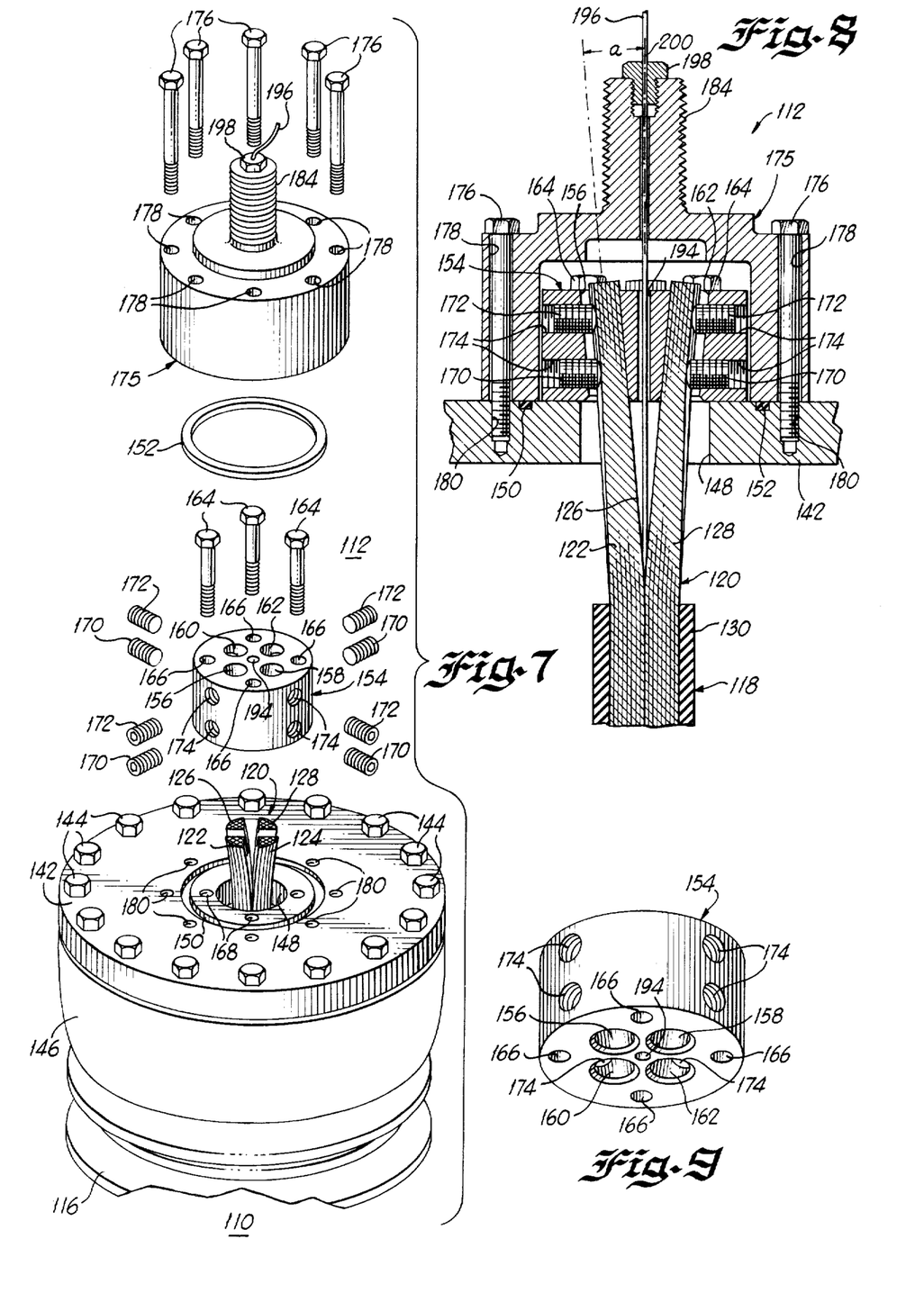
FIG. 7 is an exploded, perspective view of a portion of an alternate embodiment of a cable termination illustrating the manner in which a connector assembly is assembled in a cable termination constructed in accordance with the principles of the present invention.
FIG. 8 is an enlarged, cross-sectional view of a portion of the cable termination of FIG. 7 when assembled.
FIG. 9 is an enlarged, perspective view of a multi-barrel connector forming a portion of the cable termination connector assembly of the cable termination of FIG. 7.

The cable termination 110 of FIGS. 7 and 8 in accordance with other important aspects of the present invention includes a cable termination connector assembly 112, a porcelain insulator 116 and a base assembly 114 (not shown) which is similar to the base assembly 14 described hereinabove in connection with FIG. 1. Similarly to the cable termination 10 described hereinabove in connection with FIGS. 1 through 6, the cable termination 110 is used to terminate a high voltage power cable 118 having a segmented center conductor 120 including four center conductor segments 122, 124, 126 and 128 each formed by a plurality of individual wire strands. The wire strands in a specific embodiment are aluminum wire strands. The power cable 118 further includes cable insulation 130 surrounding the center conductor 120 and an outer conductive cable sheath as discussed hereinbefore. Other details of the cable termination 110 which are not shown and described in detail hereinafter are substantially similar to the cable termination 10 of FIG. 1.

The cable termination connector assembly 112 is provided at the upper end of the insulator 116 for physically receiving and securely retaining the center conductor 120 and for making an external connection to the center conductor 120 with an external electrical connector (not illustrated). The connector assembly 112 includes a metallic cap plate 142 formed in the preferred embodiment from tin plated aluminum and secured by a plurality of threaded fasteners 144 to a metallic cementing flange 146 cemented to the upper end of the insulator 116. The cap plate 142 includes an elongated, axially extending center aperture 148 through which the end of the center conductor 120 extends. The cap plate 142 further includes an annular recess 150 for receiving and retaining a sealing gasket 152.

A multi-barrel connector 154, formed in the preferred embodiment from tin plated aluminum, is provided to physically receive and retain the segments 122, 124, 126 and 128 of the center conductor 120. The connector 154 includes a plurality of four, elongated, generally axially extending barrels or apertures 156, 158, 160 and 162 into which the segments 122, 124 126 and 128 of the center conductor 120 are respectively extended.

In accordance with an important aspect of the present invention and similar to the cable termination connector assembly of FIGS. 1 through 6, the apertures 156, 158, 160 and 162 are canted or inclined outwardly with respect to the longitudinal axis 200 of the center conductor 120 and the multi-barrel connector 154 so as to form an acute angle "a". As discussed hereinabove, the inclination of the apertures facilitates ease of insertion of the segments 122, 124, 126 and 128 and minimizes the stripback of the cable insulation thereby effecting either a reduction in the size of the cable termination or an increase in the dielectric strength of the cable termination for a given length.

The multi-barrel connector 154 is secured in position on the cap plate 142 for effective electrical and thermal conductive contact therewith by a plurality of threaded fasteners 164 that extend through a plurality of apertures 166 in the connector 154 and are received and engaged by a plurality of threaded apertures 168 formed in the cap plate 142.

The wire strands forming the segments 122, 124, 126 and 128 are securely retained within each of the apertures 156, 158, 160 and 162 respectively, by a pair, in a specific embodiment, of preferably oval point set screws 170, 172 received within and engaged by a pair of axially aligned, threaded apertures 174. The set screws 170, 172 provide high pressure against the wire strands that form the segments 122, 124, 126 and 128 to force the wire strands against the axially extending inner walls as described hereinabove in connection with the set screws 70, 72 and the cable termination connector assembly 12. While the set screws 170, 172 are illustrated as being axially aligned in a specific embodiment, they may be offset radially with respect to the longitudinal axis 200 in an alternate embodiment as the set screws 70, 72 (FIGS. 1 through 5) for the same purpose and effect.

In a specific embodiment, the connector 154 is formed from a massive block of aluminum to thereby serve as an effective heat sink and as an electrical and thermal connection to the cap plate 142. For example, in a specific embodidment, the connector 154 may be formed from a block of aluminum having a substantially circular cross-section measuring five inches in diameter and having a thickness or axial length of two and three quarters inches. Each of the apertures 156, 158, 160 and 162 may be formed with a diameter of one inch and extend through the connector 154.

A connector housing 175 is then positioned over the connector 154 and secured to the cap plate 142 by a plurality of threaded fasteners 176 that extend through a plurality of elongated axially extending apertures 178 formed in the connector housing 175 and are received and engaged by a plurality of threaded apertures 180 formed in the cap plate 142. The connector housing 175 is formed, in the preferred embodiment, from tin plated aluminum and includes a vent valve (not shown) extending therethrough to enable the interior of the cable termination to be filled with a fluid such as a dielectric oil. The connector 154 may also include an axially extending central aperture 194. The connector housing 175 further includes a threaded connector stud 184 fixedly secured thereto. The central aperture 194 is utilized to allow a temperature sensing signal wire 196 to pass through the connector 154 which is attached to sense the temperature of the center conductor 120. The temperature sensing signal wire 196 extends through a passage in the connector stud 184 and a threaded sealing bushing 198 as indicated in FIG. 8 to be connected to a suitable measurement device. The connector housing 175 hermetically seals the interior of the cable termination 110 and the connector 154 from the atmosphere and electrically connects the center conductor 120 through a low resistance or short circuit current path through the connector 154, the cap plate 152, the connector housing 175 and the connector stud 184 to an external electrical connector (not illustrated).

A conductive corona shield (not illustrated) similar to the corona shield 86 having a centrally disposed aperture through which the connector stud 184 extends is installed over the connector housing 175 and secured in position by a plurality of threaded fasteners.

Should the connector stud 184 become damaged or separated from the connector housing 175, the cable termination 110 may be quickly and easily repaired merely be removing the corona shield and removing and replacing the damaged connector housing 175. The relatively massive cap plate 142, the connector 154 and connector housing 175 provide an effective heat sink to dissipate both ambient heat and the heat generated during the operation of the cable termination 110, thereby reducing the severity of the hot and cold, expansion and contraction cycles on the wire strands forming the center conductor 120.

Figures 10, 11, 12, 13, 14:
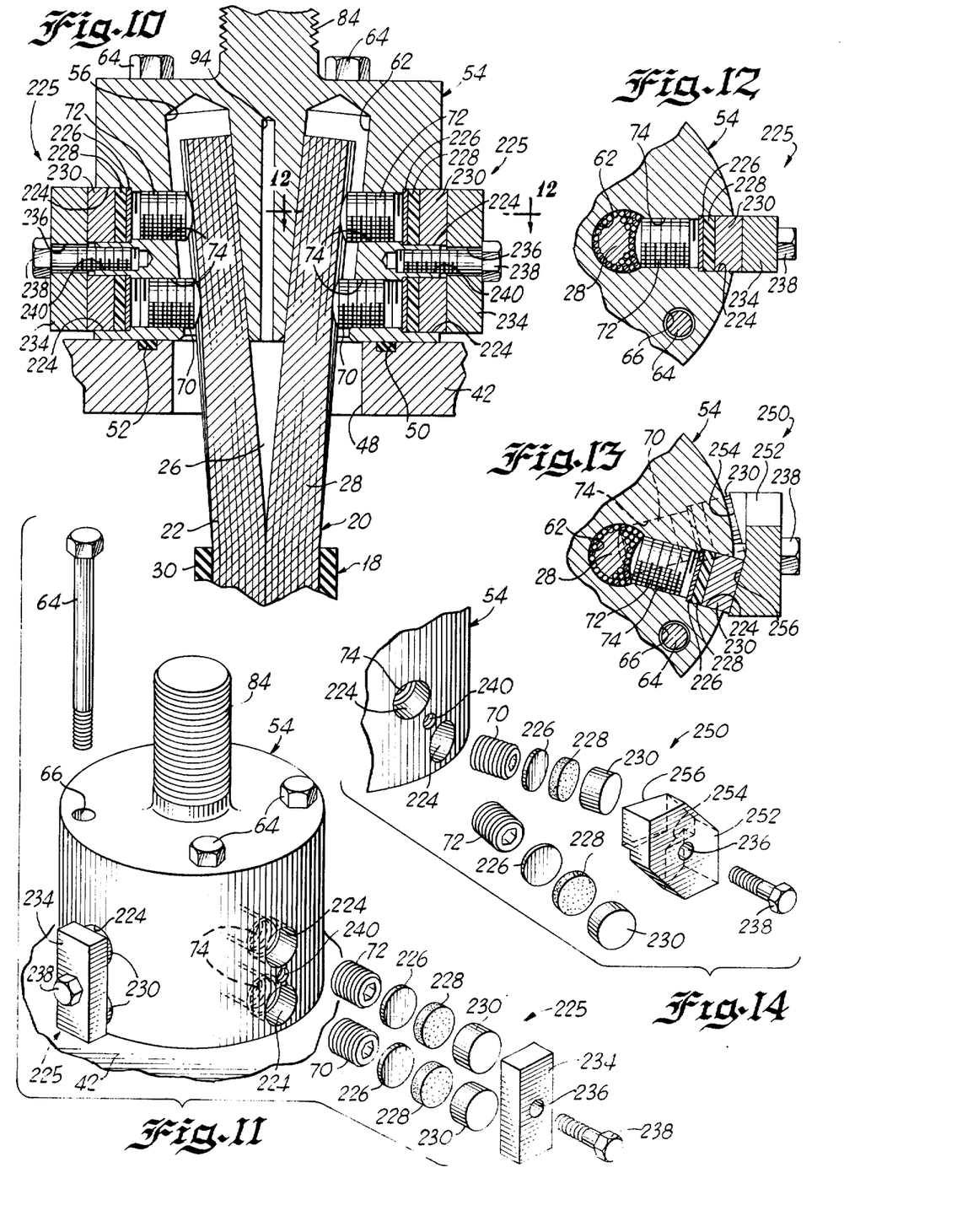
FIG. 10 is a fragmentary, cross-sectional view of a portion of another alternate embodiment of a cable termination illustrating a connector assembly constructed in accordance with the principles of the present invention.
FIG. 11 is an exploded, perspective view of a portion of the cable termination of FIG. 10 illustrating the manner in which the connector assembly is assembled and sealed in accordance with the principles of the present invention.
FIG. 12 is a fragmentary, cross-sectional view of a portion of the cable termination of FIG. 10 taken along line 12—12 of FIG. 10.
FIG. 13 is a fragmentary, cross-sectional view of a portion of the cable termination of FIG. 10 illustrating an alternate embodiment of the assembly of FIGS. 10–12.
FIG. 14 is an exploded, perspective view of a portion of the cable termination of FIG. 10 illustrating the manner in which the cable termination of FIG. 13 is assembled.

Referring now to FIGS. 10–12 and considering other important aspects of the present invention, the paired set screws 70, 72 of the connector assembly 54 of FIGS. 1–6 in an alternate embodiment are sealed by a sealing assembly referred to generally at 225 in FIGS. 10 and 11. The set screw apertures 74 are overbored to a suitable diameter to a predetermined depth to form a passage or aperture 224 but are not threaded as the apertures 78 of FIGS. 1–6.

More specifically, the sealing assembly 225 includes a first metal disc 226, an elastomeric disc or plug 228 and a a second metal disc or plug 230. The first metal disc is relatively thin compared to the elastomeric disc 228 and the second metal disc 230. The diameter of the three discs 226, 228 and 230 are slightly smaller than the diameter of the overbored passage or aperture 224 for ease of insertion. The two metal discs 226 and 230 and the elastomeric disc 228 are provided for each of the apertures 78 corresponding to a respective one of the paired set screws 70, 72 to be sealed.

In assembly, the first metal disc 226, the elastomeric disc 228 and the second metal disc 230 are inserted in the above order either separately or collectively. The depth of the inserted set screws 70, 72 and the depth of the overbored aperture 224 determine the total collective thickness of the discs 226, 228 and 230, accounting for tolerances and a predetermined length of the second metal disc 230 extending from the connector 54.

The sealing assembly 225 further includes a metal pressure mounting plate 234 of generally rectangular shape having length and width dimensions to overlay the paired apertures 224 and two of the metal discs 230 corresponding to a pair of set screws 70, 72. At the approximate center of the pressure mounting plate 234, a passage 236 is provided through which a threaded fastener 238 extends. The threaded fastener 238 is received and engaged by a threaded aperture 240 formed in the connector 54 midway between the apertures 224.

After the insertion of the discs 226, 228 and 230 into each of the apertures 224, the pressure mounting plate is positioned over the two metal discs 230 and the fastener 238 is secured into the aperture 240. As the pressure mounting plate 234 exerts force on the discs 226, 228 and 230, each of the discs 226 is forced into intimate contact with the overbored aperture 224 and the two elastomeric discs 228 are deformed against the walls of the apertures 224 to provide a hermetic seal for the set screws 70, 72 and the apertures 224.

The deformability and thickness of the elastomeric disc 228 and the applied pressure due to the securing of the fastener 238 are interrelated variables and it should be understood that various predetermined combinations of these parameters are contemplated by the present invention. It should also be understood that while aligned set screws 70, 72 are described and illustrated in FIGS. 10 through 12, the sealing assembly 225 may also be practiced in connection with the nonaligned set screw configuration as described hereinbefore in conjunction with FIGS. 1–6. Further, while the geometric shape of the mounting plate 234 is illustrated as being generally rectangular, it should be understood that an elongated oval or other suitable shapes are also contemplated.

The thickness of the first metal disc 226 is substantially less than the thickness of the elastomeric disc 228 and is capable of being flexed or deformed under the assembly pressure. The thickness of the second metal disc 230 is substantially greater than that of disc 226 and the disc 230 may be fabricated from round bar stock.

Considering the sealing of the nonaligned set screw configuration and referring now to FIGS. 13 and 14, in an alternate embodiment a sealing assembly 250 is provided including a pressure mounting plate 252 having inclined contact surfaces 254 and 256 each of which are inclined outwardly at a small acute angle as measured from a vertex at the center of the mounting plate 252. The inclined surfaces 254 and 256 are arranged such that a perpendicular to each of the inclined surfaces 254 and 256 is parallel to a respective one of the nonaligned apertures 224. The assembly and operation of the sealing assembly 250 is similar to that of the sealing assembly 225 of FIGS. 10–12. As the fastener 238 is tightened, the inclined surfaces 254 and 256 contact and apply pressure to respective combinations of the three discs 226, 228 and 230 to seal the nonaligned apertures 224 and the set screws 70, 72.

It should be understood that while the sealing assemblies 225 and 250 are described and illustrated in conjunction with a pair of set screws 70, 72, it is also contemplated that the sealing assemblies may be modified to seal three or more set screws associated with each of the apertures such as 56, 58, 60 and 62. While examples of sealing assemblies including two metal discs and one elastomeric disc are illustrated, it should also be understood that greater or fewer numbers of metal discs and/or elastomeric discs are contemplated.

Obviously, many modifications and variations of the present invention are possible in light of the above teachings. Thus, it is to be understood that, within the scope of the appended claims, the invention may be practiced otherwise than as specifically described.

What is claimed and desired to be secured by Letters Patent of the United States is:

1. A connector assembly for a high voltage cable termination comprising
    means for receiving, electrically connecting and securely retaining the bared end of a current carrying center conductor of an insulated high voltage power cable upon termination of the power cable by said cable termination, the center conductor of the power cable to be terminated having a plurality of wire strands, said receiving, electrically connecting and retaining means including a unitary conductive member having a plurality of elongated apertures formed therein, each aperture adapted to receive a desired portion of the plurality of wire strands, the desired portion comprising more than one wire strand, the longitudinal axes of said plurality of apertures each forming an acute angle with respect to each other and with respect to the longitudinal axis of the current carrying center conductor, and
    means for physically supporting said receiving, electrically connecting and retaining means in said cable termination, said supporting means comprising an annular metallic plate and fastening means for securing said metallic plate in said cable termination and for securing said conductive member to said metallic plate, said metallic plate including an annular recess formed therein and said conductive member having a larger cross-section than said annular recess.

2. A connector assembly as defined in claim 1 wherein said receiving and retaining means further comprises a plurality of set screws associated with each one of said apertures for applying a compressive force to the wire strands to force the wire strands against the interior surfaces of said apertures upon termination of the power cable, said plurality of set screws associated with each of said respective apertures being positioned at different radial and axial positions with respect to the longitudinal axis of said respective aperture.

3. A connector assembly as defined in claim 1 wherein said receiving and retaining means further comprises at least one set screw associated with each one of said apertures for applying a compressive force to the wire strands to force the wire strands against the interior surfaces of said apertures upon termination of the power cable.

4. A connector assembly as defined in claim 3 wherein each of said set screws comprises an oval point set screw.

5. A connector assembly as defined in claim 1 wherein said receiving and retaining means includes at least a pair of spaced set screws associated with each one of said apertures for applying a compressive force to the wire strands to force the wire strands against the interior surfaces of said one apertures.

6. A connector assembly as defined in claim 1 wherein said acute angle is approximately five degrees.

7. A connector assembly as defined in claim 1 wherein at least one of said apertures is substantially parallel to the longitudinal axis of the current carrying center conductor.

8. A connector assembly as defined in claim 1 wherein said conductive member is substantially square in cross-section.

9. A connector assembly as defined in claim 1 wherein said conductive member is substantially circular in cross-section.

10. A connector assembly as defined in claim 1 wherein said plurality of elongated apertures extend only a partial distance into said conductive member.

11. A connector assembly as defined in claim 1 wherein said plurality of elongated apertures each extends entirely through said conductive member.

12. A connector assembly as defined in claim 1 further comprising means for hermetically sealing said conductive member and the interior of said cable termination, said sealing means comprising an annular sealing gasket disposed in said annular recess, said conductive member being positioned to overlie said annular recess in said metallic plate and engage said annular sealing gasket to form a hermetic seal between said metallic plate and said conductive member.

13. A connector assembly for a high voltage cable termination comprising
    means for receiving, electrically connecting and securely retaining the bared end of a current carrying center conductor of an insulated high voltage power cable upon termination of the power cable by said cable termination, the center conductor of the power cable to be terminated having a plurality of wire strands, said receiving, electrically connecting and retaining means including a unitary conductive member having a plurality of elongated apertures formed therein and at least a pair of set screws being provided for and respectively associated with each one of said apertures, each of said apertures being adapted to receive a desired portion of the plurality of wire strands, the desired portion comprising more than one wire strand, said set screws applying a compressive force to the wire strands upon termination of the power cable to force the wire strands against the interior surfaces of said apertures, said set screws associated with each one of said apertures being axially spaced and radially offset from each other with respect to the longitudinal axis of each of said respective apertures, and
    means for physically supporting said receiving, electrically connecting and retaining means of said cable termination, said supporting means comprising an annular metallic plate and fastening means for securing said metallic plate in said cable termination, said metallic plate including an annular recess formed therein and said conductive member having a larger cross-section than said annular recess.

14. A connector assembly as defined in claim 13 wherein said radial offset is approximately 30 degrees.

15. A connector assembly as defined in claim 13 wherein the direction of said radial offset is opposite to the direction of the lay of the wire strands in each of said portions.

16. A connector assembly as defined in claim 13 wherein said set screws comprise oval point set screws.

17. A connector assembly as defined in claim 13 wherein said receiving and retaining means further comprises a pipe plug for each of said set screws to hermetically seal said set screws.

18. A connector assembly as defined in claim 13 further comprising means for hermetically sealing said conductive member and the interior of said cable termination, said sealing means comprising an annular sealing gasket disposed in said annular recess, said conductive member being positioned to overlie said annular recess in said metallic plate and engage said annular sealing gasket to form a hermetic seal between said metallic plate and said conductive member.

19. A connector assembly as defined in claim 13 wherein the longitudinal axes of said plurlity of apertures are nonparallel and intersecting.

20. A connector assembly for a high voltage cable termination comprising
   means for receiving, electrically connecting, securely retaining and hermetically sealing the bared end of a current carrying center conductor of an insulated high voltage power cable upon termination of the power cable by said cable termination, the center conductor having a plurality of wire strands, said receiving electrically connecting, retaining and sealing means including a unitary conductive member having a plurality of elongated apertures formed therein, at least a pair of set screws being provided for and respectively associated with each one of said apertures, each of said apertures being adapted to receive a desired portion of the plurality of wire strands upon termination of the power cable, said set screws applying a compressive force to the wire strands to force the wire strands against the interior surfaces of said apertures upon termination of the power cable, and means for sealing said set screws, said sealing means comprising a sealing element assembly disposed over each of said set screws and means provided for each of said apertures overlaying said sealing element assemblies for applying a compressive force to each of said sealing element assemblies, one of said compressive force applying means being provided for said set screws associated with each of said respective apertures and
   means for physically supporting said receiving, electrically connecting, retaining and hermetically sealing means of said cable termination, said unitary conductive member further having an overbored passage overlaying each of said set screws, each of said sealing element assemblies comprising in the order of insertion into said overbored passage a first metal disc element, an elastomeric disc element and a second metal disc element.

21. A connector assembly as defined in claim 20 wherein said compressive force applying means comprises a mounting plate having a passage formed therethrough and a threaded fastener received by a threaded aperture formed in said unitary conductive member in the vicinity of said set screws.

22. A connector assembly as defined in claim 21 wherein said set screws associated with each of said apertures are axially spaced and radially offset from each other with respect to the longitudinal axis of said one aperture.

23. A connector assembly as defined in claim 22 wherein said mounting plate includes an inclined surface corresponding to each of said sealing element assemblies being disposed such that a perpendicular to each inclined surface is parallel to the longitudinal axis of a corresponding set screw.

24. A connector assembly as defined in claim 20 wherein said second metal disc element has a thickness substantially greater than that of said first metal disc element.

25. A connector assembly as defined in claim 20 wherein the thickness of said elastomeric disc element and the applied compressive force are sufficient to deform said elastomeric disc element to hermetically seal said associated set screw and said unitary conductive member.

26. A connector assembly as defined in claim 20 wherein the desired portion of the plurality of wire strands comprises more than one wire strand and said plurality of apertures extend only a partial distance into said conductive member.

27. A connector assembly having component parts capable of being affixed onto a cable termination for terminating an elongated end portion of an insulated high voltage power cable of the type having a current carrying center conductor formed by a plurality of wire strands, said connector assembly comprising
   means for receiving, electrically connecting, hermetically sealing and securely retaining the bared end of a current carrying center conductor of an insulated high voltage power cable upon termination of the power cable, the center conductor having a plurality of wire strands, said receiving, electrically connecting and retaining means including a unitary conductive member having a plurality of elongated apertures formed therein, a plurality of set screws being provided for and respectively associated with each one of said apertures, said set screws associated with each of said apertures being axially spaced and radially offset from each other with respect to the longitudinal axis of each of said respective apertures, each of said apertures being adapted to receive a desired portion of the plurality of wire strands, the desired portion comprising more than one wire strand, said set screws applying a compressive force to the wire strands to force the wire strands against the interior surfaces of said apertures upon termination of the power cable,
   and means for sealing said set screws, said sealing means comprising a sealing element assembly disposed over each of said set screws and means provided for each of said apertures overlaying said sealing element assemblies for applying a compressive force to each of said sealing element assemblies, one of said compressive force applying means being provided for said set screws associated with each of said respective apertures, said unitary conductive member further comprising an overbored passage overlaying each of said set screws and each of said sealing element assemblies comprises in the order of insertion into said overbored passage a first metal disc element, an elastomeric disc element and a second metal disc element.

28. A connector assembly as defined in claim 27 wherein said compressive force applying means comprises a mounting plate having a passage formed therein and a threaded fastener received by a threaded aperture formed in said unitary conductive member in the vicinity of said set screws.

29. A connector assembly for a high voltage cable termination comprising
   means for receiving, electrically connecting and securely retaining the bared end of a current carrying center conductor of an insulated high voltage power cable upon termination of the power cable, the center conductor of the power cable to be terminated having a plurality of wire strands, said receiving, electrically connecting and retaining means including a unitary conductive member having a plurality of elongated apertures formed therein, each aperture adapted to receive a desired portion of the plurality of wire strands, the desired portion comprising more than one wire strand, the longitudinal axes of a predetermined number of said plurality of apertures each forming an acute angle with respect to the longitudinal axis of the current carrying center conductor, and means for physically supporting said receiving, electrically connecting and retaining means in said cable termination, said supporting means comprising an annular metallic plate and fastening means for securing said metallic plate in said cable termination, said metallic plate including an annular recess formed therein and said conductive member having a larger cross-section than said annular recess.

30. A connector assembly as defined in claim 29 further comprising means for hermetically sealing said conductive member and the interior of said cable termination, and second fastening means for securing said conductive member to said metallic plate, said sealing means comprising an annular sealing gasket disposed in said annular recess, said conductive member being positioned to overlie said annular recess in said metallic plate and engage said annular sealing gasket to form a hermetic seal between said metallic plate and said conductive member.

31. A connector assembly for a high voltage cable termination comprising means for receiving, electrically connecting and securely retaining the bared end of a current carrying center conductor of an insulated high voltage power cable upon termination of the power cable, the center conductor of the power cable to be terminated having a plurality of wire strands, said receiving, electrically connecting and retaining means including a unitary conductive member having a plurality of elongated apertures formed therein and at least a pair of set screws associated with each one of said apertures, each of said apertures being adapted to receive a desired portion of the plurality of wire strands, the desired portion comprising more than one wire strand, said plurality of set screws applying a compressive force to the wire strands to force the wire strands against the interior surfaces of said apertures upon termination of the power cable, said plurality of set screws associated with each of said apertures being axially spaced and radially offset from each other with respect to the longitudinal axis of each of said respective apertures, and means for physically supporting said receiving, electrically connecting and retaining means of said cable termination, said supporting means comprising an annular metallic plate and fastening means for securing said metallic plate in said cable termination, said metallic plate including an annular recess forced therein and said conductive member having a larger cross-section than said annular recess.

32. A connector assembly as defined in claim 31 further comprising means for hermetically sealing said conductive member and the interior of said cable termination, and second fastening means for securing said conductive member to said metallic plate, said sealing means comprising an annular sealing gasket disposed in said annular recess, said conductive member being positioned to overlie said annular recess in said metallic plate and engage said annular sealing gasket to form a hermetic seal between said metallic plate and said conductive member.

* * * * *